United States Patent Office 3,533,722
Patented Oct. 13, 1970

3,533,722
MONOAZO DYESTUFFS
Hans E. Wegmüller, Riehen, Switzerland, assignor to
J. R. Geigy A.G., Basel, Switzerland
No Drawing. Filed Sept. 19, 1966, Ser. No. 580,184
Claims priority, application Switzerland, Sept. 24, 1965,
13,252/65
Int. Cl. C09b 29/00; D06p 3/54
U.S. Cl. 8—26                                    4 Claims

ABSTRACT OF THE DISCLOSURE

Monoazo dyestuffs of the formula

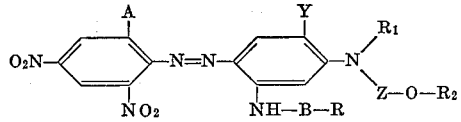

wherein

A represents hydrogen, chlorine or bromine, lower alkyl, lower alkoxy, lower carbalkoxy or lower alkylsulfonyl;
Y represents lower alkoxy;
B represents the —CO—, —COO— or —SO$_2$-group;
R represents lower alkyl;
Z represents alkylene having 2 to 4 carbon atoms;
R$_1$ represents monocarbocyclic aryl-lower alkyl which may be ring-substituted by halogen, lower alkyl, or lower alkoxy; and
R$_2$ represents lower alkanoyl, as well as mixtures of such dyestuffs, are useful in the dyeing of hydrophobic organic fiber material.

The present invention concerns new, only slightly water soluble monoazo dyestuffs which can be used as dispersion dyestuffs, a process for the production thereof, processes for the dyeing of hydrophobic organic fiber material, particularly that consisting of polyglycol terephthalate, using the new dyestuffs and hydrophobic organic fibers dyed with the aid of these dyestuffs.

The dyeing of polyglycol terephthalate fibers and fabrics in deep navy blue shades which are fast to sublimation, makes the greatest demands on the dyestuffs used. Deep, strong dyeings having the great fastness properties required by the user can only be attained with dyestuffs which have an extraordinarily good build up and great colour strength.

Dyestuffs lacking in this respect lead to dyeings which are not fast to rubbing and, under unfavourable conditions, e.g. if tightly twisted yarns in the form of cross wound bobbins or if polyester fibres in the form of slubbing are to be dyed, lead to visible precipitations of the dyestuff.

It has now been found that in slightly water soluble monoazo dyestuffs which are suitable to attain navy blue shades on polyester fibres, which shades are fast in use, are obtained by coupling the diazonium compound of an amine of Formula I

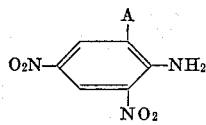

with a coupling component of Formula II

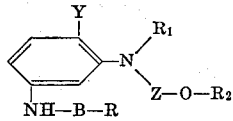

to form an azo dyestuff of Formula III

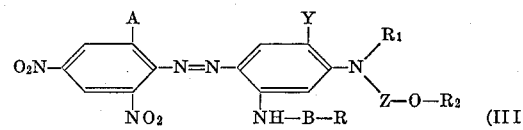

In these formulas:

A represents hydrogen, chlorine or bromine, lower alkyl, lower alkoxy, lower carbalkoxy or lower alkylsulfonyl;
Y represents lower unsubstituted or non-ionically substituted alkoxy;
B represents the —CO—, —COO— or —SO$_2$— group;
R represents lower unsubstituted or non-ionically substituted alkyl;
Z represents alkylene having 2 to 4 carbon atoms;
R$_1$ represents monocarbocyclic aryl-lower alkyl which may be ring-substituted by halogen, lower alkyl, or lower alkoxy;
R$_2$ represents lower unsubstituted or non-ionically substituted alkanoyl.

When A is a lower alkyl, alkoxy, carbalkoxy or alkylsulphonyl group, then it is preferably the methyl or ethyl group, the methoxy or ethoxy group, the carbomethoxy or carboethoxy group, or the methylsulphonyl or ethylsulphonyl group. However, A is preferably hydrogen, chlorine or bromine. When Y is an unsubstituted lower alkoxy group then it advantageously contains 1 to 4 carbon atoms. When this lower alkoxy group is non-ionically substituted, substituents are e.g. lower alkanoyloxy groups the alkanoyl radical of which preferably has 2 to 4 carbon atoms, e.g. the acetyloxy or propionyloxy group; lower alkoxy groups such as the methoxy or ethoxy group; halogens such as chlorine or bromine; or the cyano group. Hetero atoms in Y should be separated preferably by a chain of at least two carbon atoms.

The lower unsubstituted alkyl group R advantageously has 1 to 4 carbon atoms. If this group is non-ionically substituted, then examples of substituents are halogens such as chlorine or bromine, or lower alkoxy or alkanoyloxy groups, e.g. those mentioned in the preceding paragraph.

The alkylene group Z can be straight or branched chained; in the former case it is preferably the 1,2-ethylene group, in the latter the 1,2-propylene or 1,2-butylene group.

R$_1$ represents monocarbocyclic aryl-lower alkyl, preferably phenylalkyl such as α-phenyl-ethyl, β-phenyl-ethyl, γ-phenyl-propyl or, particularly, a benzyl group the benzene nucleus of which can contain nonionic substituents, especially halogens such as chlorine or bromine, lower alkyl groups such as the methyl or ethyl group, or lower alkoxy groups such as the methoxy or ethoxy group.

The lower unsubstituted alkanoyl group R$_2$ advantageously contains 2 to 4 carbon atoms. It can contain non-ionic substituents e.g. halogen such as chlorine.

Preferably, coupling components of Formula II are used wherein Y is the methoxy or ethoxy group, B is the —CO— group, R is the methyl group, Z is the

—CH$_2$CH$_2$— group, R$_1$ is the benzyl group and R$_2$ is the acetyl group.

The term "lower" as used herein in connection with "alkyl," "alkoxy" and "alkylsulfonyl" means that these radicals have 1 to 5 carbon atoms, in connection with "alkanoyl," "alkanoyloxy" and "carbalkoxy" it means radicals of from 2 to 5 carbon atoms. Lower alkyl in connection with monocarbocyclic aryl means that the alkyl group may have from 1 to 3 carbon atoms.

Diazo components of Formula I which can be used according to the invention are known. Examples thereof are:

1-amino-2,4-dinitrobenzene,
1-amino-2,4-dinitro-6-methyl- or -6-ethyl-benzene,
1-amino-2,4-dinitro-6-methoxy- or -6-ethoxy-benzene,
1-amino-2,4-dinitro-6-carbomethoxy- or -6-carboethoxy-benzene,
1-amino-2,4-dinitro-6-methylsulphonyl- or-6-ethylsulphonyl-benzene, or
1-amino-2,4-dinitro-6-chloro- or -6-bromo-benzene.

The coupling components used according to the invention of Formula II are obtained, for example, by reacting a compound of Formula IV

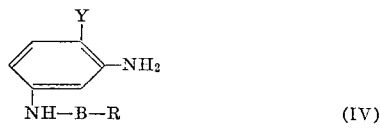
(IV)

with an aralkylating agent introducing $R_1$, e.g. benzyl chloride, hydroxyalkylating the aralkylamino compound obtained by means of an alkylene oxide introducing a radical —Z—OH, e.g. with one equivalent of ethylene oxide, 1,2-propylene oxide or 1,2-butylene oxide, and acylating the N-hydroxyalkyl-N-aralkylamino compound obtained with an acylating agent introducing $R_2$ such as acetyl chloride or acetanhydride. In the above, the symbols B, R, Y, Z, $R_1$ and $R_2$ have the meanings given for Formulae II and III. Examples of such coupling components are:

1-[N-benzyl-N-($\beta$-acetoxyethyl)-amino]-2-methoxy-5-acetylaminobenzene,
1-[N-(2- or 4-chlorobenzyl)-N-($\beta$-acetoxyethyl)-amino]-2-methoxy-5-acetylaminobenzene,
1-[N-(2- or 4-methylbenzyl)-N-($\beta$-acetoxyethyl)-amino]-2-methoxy-5-acetylaminobenzene,
1-[N-($\alpha$-phenylethyl)-N-($\beta$-acetoxyethyl)-amino]-2-methoxy-5-acetylaminobenzene,
1-[N-($\beta$-phenylethyl)-N-($\beta$-acetoxyethyl)-amino]-2-methoxy-5-acetylaminobenzene,
1-[N-($\gamma$-phenylpropyl)-N-($\beta$-acetoxyethyl)-amino]-2-methoxy-5-acetylaminobenzene,
1-[N-benzyl-N-($\beta$-acetoxypropyl)-amino]-2-methoxy-5-acetylaminobenzene,
1-[N-benzyl-N-($\beta$-acetoxybutyl)-amino]-2-methoxy-5-acetylaminobenzene,
1-[N-benzyl-N-($\beta$-propionyloxyethyl)-amino]-2-methoxy-5-acetylaminobenzene,
1-[N-benzyl-N-($\beta$-butyryloxyethyl)-amino]-2-methoxy-5-acetylaminobenzene,
1-[N-benzyl-N-($\beta$-acetoxyethyl)-amino]-2-ethoxy-5-acetylaminobenzene,
1-[N-benzyl-N-($\beta$-acetoxyethyl)-amino]-2-($\beta$-methoxyethoxy)-5-acetylaminobenzene,
1-[N-benzyl-N-($\beta$-acetoxyethyl)-amino]-2-($\beta$-ethoxyethoxy)-5-acetylaminobenzene,
1-[N-benzyl-N-($\beta$-acetoxyethyl)-amino]-2-($\beta$-acetoxyethoxy)-5-acetylaminobenzene,
1-[N-benzyl-N-($\beta$-acetoxyethyl)-amino]-2-($\beta$-chlorethoxy)-5-acetylaminobenzene,
1-[N-benzyl-N-($\beta$-acetoxyethyl)-amino]-2-methoxy-5-propionylaminobenzene,
1-[N-benzyl-N-($\beta$-acetoxyethyl)-amino]-2-methoxy-5-butyrylaminobenzene,
1-[N-benzyl-N-($\beta$-acetoxyethyl)-amino]-2-methoxy-5-carbomethoxyaminobenzene,
1-[N-benzyl-N-($\beta$-acetoxyethyl)-amino]-2-methoxy-5-carbethoxyaminobenzene,
1-[N-benzyl-N-($\beta$-acetoxyethyl)-amino]-2-methoxy-5-carbobutoxyaminobenzene,
1-[N-benzyl-N-($\beta$-acetoxyethyl)-amino]-2-methoxy-5-methylsulphonylaminobenzene, or
1-[N-benzyl-N-($\beta$-acetoxyethyl)-amino]-2-methoxy-5-butylsulphonylaminobenzene.

The coupling of the diazonium compound of an amine of Formula I with the coupling component of Formula II is preferably performed in a strong to weakly acid aqueous medium. In a strongly acid coupling, advantageous the acid is gradually buffered, e.g. with alkali metal salts of lower fatty acid.

It is advantageous to bring the dyestuffs according to the invention into a finely distributed form by milling with dispersing agents. For this purpose, anionic dispersing agents e.g. alkylaryl sulfonates, condensation products of formaldehyde with naphthalene sulfonic acids, lignin sulfonates, or non-ionogenic dispersing agents such as fatty alcohol or higher alkylphenolpolyglycol ethers, are suitable. The dyestuffs according to the invention are preferably milled with such dispersing agents with the addition of water. The resultant aqueous dyestuff pastes which contain the dyestuffs in finely distributed form can be used direct for dyeing or can be converted into non-dusty powders by careful drying by known methods.

In such forms the dyestuffs according to the invention are suitable for the dyeing of hydrophobic, organic textile fibers from an aqueous dispersion, for example for the dyeing of cellulose triacetate fibers, particularly however, for the dyeing of textile fibers made from high molecular esters of aromatic polycarboxylic acids with polyfunctional alcohols, e.g. polyglycol terephthalate, polyglycol isophthalate or polycyclohexanediol terephthalate fibers.

However, the dyestuffs can be used for the dyeing of synthetic polyamide fibers such as nylon.

In some casse, valuable dyeings can also be obtained on polyacrylonitrile fibers with the dyestuffs according to the invention.

Polyglycol terephthalate fibers are dyed with aqueous dispersions of the dyestuffs according to the invention preferably at temperatures of over 100° C. under pressure. However, dyeing can also be performed at the boiling point of the dye liquor in the presence of carriers, e.g. alkali phenyl phenolates such as sodium-o-phenyl phenolate, polychlorobenzene compounds or similar auxiliaries.

The dyestuffs according to the invention have extraordinarily good affinity to hydrophobic organic fibers, particularly to polyglycol terephthalate fibers, and on these fibers they produce level violet and especially navy blue dyeings which have very good fastness to washing, milling, sublimation, light, rubbing, perspiration, solvents, cross dyeing, decatising and industrial fumes. Especially, vegetable and animal fibers, particularly cotton, are reserved well by the dyestuffs according to the invention.

The dyestuffs according to the invention are distinguished over previously known compounds of similar constitution by extraordinarily good build up, great colour strength, stability to boiling and a wide pH-range and by the excellent fastness properties in use of the navy blue dyeings attained therewith on polyester fibers. A further advantage of the dyestuffs according to the invention is that they are suitable for the so-called thermosol dyeing process, a condition for which is high grade fastness to sublimation. In this process they also produce level, violet and especially navy blue dyeings which are fast to rubbing. In addition, the variations in the fixing temperature which are usual under practical conditions do not noticeably affect the shade and depth of the dyeings.

Very valuable dyeings are also obtained with mixtures of dyestuffs according to the invention, particularly with mixtures which are obtained from two different diazo components usable according to the invention. Such mixtures are distinuished by very good penetration powers and, especially on polyglycol terephthalate fibres, produce very level and fast dyeings.

The following examples illustrate the invention. The temperature are given therein in degrees centigrade.

EXAMPLE 1

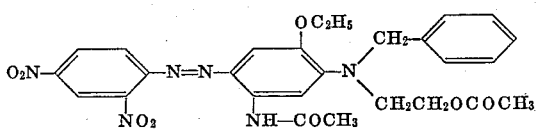

37.0 g. of 1-[N-benzyl-N-(β-acetoxyethyl)-amino]-2-ethoxy-5-acetylaminobenzene are dissolved in 750 g. of 60% acetic acid. The diazonium salt solution of 18.3 g. 1-amino-2,4-dinitrobenzene is produced by dissolving 1-amino-2,4-dinitrobenzene in 100 g. of concentrated sulfuric acid and diazotising with the amount of nitrosyl sulfuric acid corresponding to 6.9 g. of sodium nitrite. This diazonium salt solution is added dropwise to the above solution at 0–5°. On completion of this dropwise addition, 400 g. of ice water and 100 g. of sodium acetate are added to the coupling mixture. The violet dyestuff precipitates, the composition of which corresponds to the above formula, is then filtered off, thoroughly washed with water and then dried at 70–80° in vacuo. 5 g. of this dyestuff are milled with 15 g. of sodium salt of a condensation product of naphthalene-2-sulfonic acid and formaldehyde. Polyglycol terephthalate fibers can be dyed with this dye preparation from an aqueous dispersion, optionally in the presence of a carrier such as sodium-o-phenyl phenolate, in reddish navy blue shades. The dyeings have very good fastness to rubbing, light and sublimation.

The 1-[N-benzyl-N-(β-acetoxyethyl)-amino]-2-ethoxy-5-acetylaminobenzene used in this example as coupling component can be produced, e.g., by reacting 1-amino-2-ethoxy-5-acetyl-aminobenzene with benzyl chloride, adding 1 equivalent of ethylene oxide to the 1-benzylamino-2-ethoxy-5-acetylaminobenzene obtained and then acetylating the 1-[N-benzyl-N-(β-hydroxyethyl)-amino]-2-ethoxy-5-acetylaminobenzene.

If instead of the 37 g. of 1-[N-benzyl-N-(β-acetoxyethyl)-amino]-2-ethoxy-5-acetylaminobenzene, the corresponding amount of one of the coupling components given in the following Table I is used and this is coupled under the conditions given in Example 1 with the diazonium salt solution of 1-amino-2,4-dinitrobenzene, then dyestuffs are obtained which produce dyeings on polyglycol terephthalate fibers which have similarly good properties.

TABLE I

Coupling component

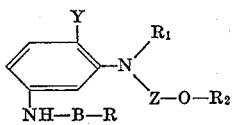

| Number | Y | B | R | Z | $R_1$ | $R_2$ | Shade on polyglycol terephthalate fibers |
|---|---|---|---|---|---|---|---|
| 2 | —OCH₃ | —CO— | —CH₃ | —CH₂CH₂— | —CH₂—⌬ | —COCH₃ | Reddish navy blue. |
| 3 | —OCH₃ | —CO— | —CH₂CH₃ | —CH₂CH₂— | —CH₂—⌬ | —COCH₂Cl | Do. |
| 4 | —OCH₃ | —CO— | —CH₂CH₃ | —CH₂CH₂— | —CH₂—⌬ | —COCH₃ | Do. |
| 5 | —OC₂H₅ | —CO— | —CH₂CH₃ | —CH₂CH₂— | —CH₂—⌬—OCH₃ | —COCH₃ | Do. |
| 6 | —OC₂H₅ | —CO— | —CH₂CH₃ | —CH₂CH₂— | —CH(CH₃)—⌬ | —COCH₃ | Do. |
| 7 | —OC₂H₅ | —CO— | —CH₃ | —CH₂CH(CH₃)— | —CH₂—⌬ | —COCH₃ | Do. |
| 8 | —OCH₃ | —CO— | —C₃H₇ | —CH₂CH₂— | Same as above | —COCH₃ | Do. |
| 9 | —OCH₃ | —CO— | —CH₂OCH₃ | —CH₂CH₂— | do | —COCH₃ | Do. |
| 10 | —OCH₃ | —COO— | —C₄H₉ | —CH₂CH₂— | do | —COCH₃ | Violet. |
| 11 | —OCH₃ | —SO₂— | —CH₃ | —CH₂CH₂— | do | —COCH₃ | Reddish violet. |
| 12 | —OC₂H₅ | —SO₂— | —CH₃ | —CH₂CH₂— | do | —COCH₃ | Do. |
| 13 | —OC₃H₇ | —CO— | —CH₃ | —CH₂CH₂— | do | —COCH₃ | Reddish navy blue. |
| 14 | —OC₃H₇ | —CO— | —C₂H₅ | —CH₂CH₂— | do | —COCH₃ | Do. |
| 15 | —OCH₂CH₂CN | —CO— | —C₂H₅ | —CH₂CH₂— | do | —COCH₃ | Do. |
| 16 | —OC₄H₉ | —CO— | —C₂H₅ | —CH₂CH₂— | do | —COCH₃ | Do. |
| 17 | —OCH₃ | —CO— | —CH₂Br | —CH₂CH₂— | do | —COCH₃ | Do. |

EXAMPLE 18

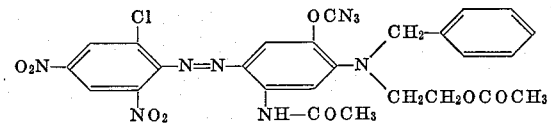

21.7 g. of 1-amino-2,4-dinitro-6-chlorobenzene are dissolved in 120 g. of concentrated sulfuric acid and the solution is diazotised at 20–25° with nitrosyl sulfuric acid, corresponding to 6.9 g. of sodium nitrite, for 3 hours. The diazonium salt solution so obtained is added dropwise at 0–5° to a solution of 35.6 g. of 1-[N-benzyl-N-(β-acetoxyethyl)-amino]-2-methoxy-5-acetylaminobenzene in 850 g. of 55% acetic acid. 750 ml. of ice water and 150 g. of sodium acetate are then added to the coupling mixture. On completion of the coupling, the greenish black dye-stuff precipitates, the composition of which corresponds to the formula given above, is filtered off, washed in the usual way with a large amount of water and dried. 10 g. of the dyestuff so obtained are brought into finely disperable form in water by milling intensively with 25 g. tion is dia zotised at 20–25° with nitrosyl sulfuric acid, of a lignin sulfonate. Polyglycol terephthalate fibers can be dyed with the preparation from aqueous dispersion, optionally in the presence of a carrier such as trichlorobenzene, in greenish navy blue shades. The dyebath is substantially exhausted. The dyeings have very good fastness to washing, rubbing, light and sublimation.

The 1-[N-benzyl - N - β-acetoxyethyl)-amino]-2-methoxy-5-acetylaminobenzene used in this example as coupling component is obtained e.g. by condensing benzyl chloride with 1-amino-2-methoxy-5-acetylaminobenzene, adding 1 equivalent of ethylene oxide to the 1-benzylamino - 2 - methoxy-5-acetylaminobenzene obtained and then acetylating the 1 - [N-benzyl - N-(β-hydroxyethyl)-amino]-2-methoxy-5-acetylaminobenzene.

Dyestuffs having similar properties are obtained if the diazonium salt solution of the 1-amino-2,4-dinitro-6-chlorobenzene is coupled under the conditions described in example 18 with one of the coupling components given in the following Table II.

mixture of dyestuffs precipitates the composition of which corresponds to the two formulas given above. It is then worked up as described in Examples 18. 10 g. of the dyestuff mixture so obtained are milled finely with 30 g. of a lignin sulfonate. Polyglycol terephthalate fibers can be dyed with this dye preparation, optionally in the presence of a carrier such as trichlorobenzene, in navy blue shades. The dyebath is substantially exhausted.

When the procedure of Example 33 is repeated, but 9.2 g. of 1-amino-2,4-dinitrobenzene and 10.8 g. of 1-amino-2,4-dinitro-6-chlorobenzene are replaced by 1.83 g. of 1-amino-2,4-dinitrobenzene and 23.7 g. of 1-amino-2,4-dinitro - 6-bromobenzene, a dyestuff mixture is obtained which is an excellent dyestuff for polyglycol terephthalate fibers for navy blue shades.

TABLE II

Coupling component

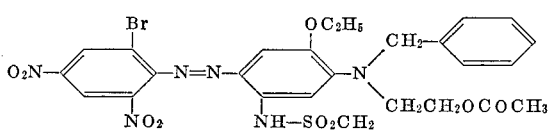

| No. | Y | B | R | Z | $R_1$ | $R_2$ | Shade on polyglycol terephthalate fibers |
|---|---|---|---|---|---|---|---|
| 19 | —$OCH_3$ | —CO— | —$CH_3$ | —$CH_2CH_2$— | —$CH_2$—⟨⟩ | —$COC_2H_5$ | Greenish navy blue. |
| 20 | —$OCH_3$ | —CO— | —$CH_3$ | —$CH_2CH_2$— | —$CH_2$—⟨⟩ | —$COCH_2Cl$ | Do. |
| 21 | —$OCH_3$ | —CO— | —$CH_3$ | —$CH_2CH_2$— | —$CH_2$—⟨⟩—Br | —$COCH_3$ | Do. |
| 22 | —$OCH_3$ | —CO— | —$CH_3$ | —$CH_2CH_2$— | —$CH_2CH_2$—⟨⟩ | —$COCH_3$ | Do. |
| 23 | —$OC_2H_5$ | —CO— | —$CH_3$ | —$CH_2CH_2$— | —$CH_2$—⟨⟩ | —$COCH_3$ | Do. |
| 24 | —$OC_2H_5$ | —CO— | —$CH_3$ | —$CH_2CH_2$— | —CH(CH_3)—⟨⟩ | —$COCH_3$ | Do. |
| 25 | —$OCH_3$ | —CO— | —$CH_3$ | —$CH_2CH(CH_2CH_3)$— | —$CH_2$—⟨⟩ | —$COCH_3$ | Do. |
| 26 | —$OCH_3$ | —CO— | —$CH_2Cl$ | —$CH_2CH_2$— | Same as above | —$COCH_3$ | Do. |
| 27 | —$OCH_3$ | —CO— | —$CH_2O$—$COCH_3$ | —$CH_2CH_2$— | do | —$COCH_3$ | Do. |
| 28 | —$OC_2H_5$ | —COO— | —$CH_2CH_2OCH_3$ | —$CH_2CH_2$— | do | —$COCH_3$ | Reddish navy blue. |
| 29 | —$OC_2H_5$ | —$SO_2$— | —$C_2H_5$ | —$CH_2CH_2$— | do | —$COCH_3$ | Violet. |
| 30 | —$OCH_2CH_2Cl$ | —CO— | —$CH_3$ | —$CH_2CH_2$— | do | —$COCH_3$ | Greenish navy blue. |
| 31 | —$OCH_2CH_2OCH_3$ | —CO— | —$CH_3$ | —$CH_2CH_2$— | do | —$COCH_3$ | Do. |
| 32 | —$OCH_2CH_2$—O—$COC_2H_5$ | —CO— | —$CH_3$ | —$CH_2CH_2$— | do | —$COC_2H_5$ | Do. |

EXAMPLE 33

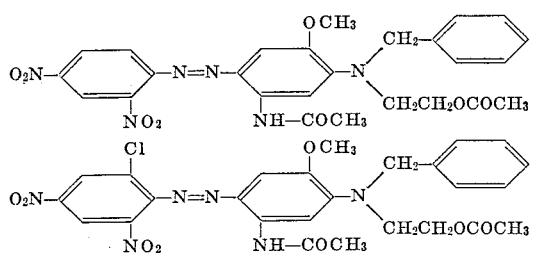

9.2 g. of 1-amino-2,4-dinitrobenzene and 10.8 g. of 1-amino-2,4-dinitro-6-chlorobenzene are mixed together and dissolved in 100 g. of concentrated sulfuric acid. This mixture is diazotised in the usual way at 20–25° with nitrosyl sulfuric acid, corresponding to 6.9 g. of sodium nitrite. The diazonium salt solution so produced is added dropwise at 0–5° to a solution of 35.6 g. of 1-[N-benzyl-N - (β - acetoxyethyl) - amino]-2-methoxy-5-acetylaminobenzene in 850 g. of 55% acetate acid. The

EXAMPLE 34

26.2 g. of 1-amino-2,4-dinitro-6-bromobenzene are dissolved in 80 g. of concentrated sulfuric acid and, at 20–25°, the solution is diazotized with nitrosyl sulfuric acid, corresponding to 6.9 g. of sodium nitrite. At 0–5°, this diazonium salt solution is added dropwise to a solution of 40.6 g. of 1-[N-benzyl-N-(β-acetoxyethyl)-amino]-2-ethoxy-5-methylsulphonylaminobenzene in 600 g. of 50% acetic acid. 500 ml. of ice water and 100 g. of sodium acetate are then added to the coupling mixture. On completion of the coupling, the black dyestuff precipitates, is filtered off, washed neutral with dilute sodium carbonate solution and then washed free of salt with a large amount of water. 10 g. of the dyestuff so obtained, the composition of which corresponds to the above formula, are brought into a form which is finely dispersable in water by milling with 30 g. of lignin sulfonate. Polyglycol terephthalate fibers can be dyed with this dye preparation from aqueous dispersion, optionally in the presence of a carrier such as sodium-o-phenyl phenolate, in violet shades.

The 1-[N-benzyl-N-(β-acetoxyethyl)-amino]-2-ethoxy-5-methylsulfonylaminobenzene used as coupling component in this example is obtained, for example, by reacting 1-amino-2-ethoxy-5-methylsulfonylaminobenzene with benzyl chloride, adding 1 equivalent of ethylene oxide and then acetylating the 1-[N-benzyl-N-(β-hydroxyethyl)-amino]-2-ethoxy-5-methylsulfonylaminobenzene obtained.

Dyestuffs having similar properties are obtained when the diazonium salt solution of 1-amino-2,4-dinitro-6-bromobenzene is coupled under the conditions of Example 34 with one of the coupling components given in the following Table III.

EXAMPLE 52

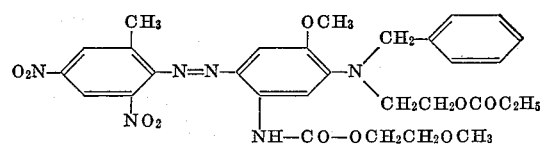

19.7 g. of 1-amino-2,4-dinitro-6-methylbenzene are dissolved in 80 g. of concentrated sulfuric acid and the solution is diazotised at 20–25° with the amount of nitrosyl sulfuric acid corresponding to 6.9 g. of sodium nitrite.

43 g. of 1-[N-benzyl-N-(β-propionyloxyethyl)-amino]-2-methoxy-5-[β-(methoxyethoxy)-carbonylamino]-benzene are dissolved in 700 g. of glacial acetic acid and 350 g. of water, and the solution is cooled to 0–5°. The above diazonium salt solution is added dropwise to this solution, care being taken that the temperature does not rise above 5°. On completion of the dropwise addition, 200 g.

TABLE III

Coupling component

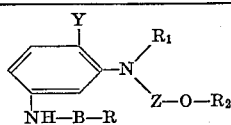

| No. | Y | B | R | Z | $R_1$ | $R_2$ | Shade on polyglycol teretphthalate fibers |
|---|---|---|---|---|---|---|---|
| 35 | —OCH₃ | —CO— | —CH₃ | —CH₂CH₂— | —CH₂—⟨phenyl⟩ | —COC₃H₇ | Greenish navy blue. |
| 36 | —OCH₃ | —CO— | —CH₃ | —CH₂CH₂— | —CH₂—⟨phenyl⟩ | —COC₂H₅ | Do. |
| 37 | —OCH₃ | —CO— | —CH₃ | —CH₂CH₂— | —CH₂—⟨phenyl-CH₃⟩ | —COCH₃ | Do. |
| 38 | —OC₂H₅ | —CO— | —CH₃ | —CH₂CH₂— | —CH₂CH₂CH₂—⟨phenyl⟩ | —COCH₃ | Do. |
| 39 | —OC₂H₅ | —CO— | —CH₃ | —CH₂CH₂— | —CH(CH₃)—⟨phenyl⟩ | —COCH₃ | Do. |
| 40 | —OC₂H₅ | —CO— | —CH₃ | —CH₂CH₂— | —CH₂—⟨phenyl⟩ | —COCH₃ | Do. |
| 41 | —OCH₃ | —CO— | —C₂H₅ | —CH₂CH₂ | —CH₂—⟨phenyl⟩ | —COCH₃ | Do. |
| 42 | —OC₂H₅ | —CO— | —C₂H₅ | —CH₂CH₂— | Same as above | —COCH₃ | Do. |
| 43 | OCH₃ | —CO— | —CCl₃ | —CH₂CH₂— | ...do... | —COCH₃ | Do. |
| 44 | —OC₂H₅ | —COO— | —C₂H₅ | —CH₂CH₂— | ...do... | —COCH₃ | Reddish navy blue. |
| 45 | —OC₂H₅ | —COO— | —CH₂CH₂OCH₂CH₃ | —CH₂CH₂— | ...do... | —COCH₃ | Do. |
| 46 | —OCH₃ | —SO₂— | —CH₃ | —CH₂CH₂— | —CH₂—⟨phenyl⟩ | —COCH₃ | Violet. |
| 47 | —OCH₃ | —SO₂— | —C₂H₅ | —CH₂CH₂— | —CH₂CH₂—⟨phenyl⟩ | —COCH₃ | Do. |
| 48 | —OCH₂CH₂Br | —CO— | —C₂H₅ | —CH₂CH₂— | —CH₂—⟨phenyl⟩ | —COCH₃ | Greenish navy blue. |
| 49 | —OCH₂CH₂OCOCH₃ | —CO— | —CH₃ | —CH₂CH₂— | Same as above | —COCH₃ | Do. |
| 50 | —OCH₂CH₂OCH₂CH₃ | —CO— | —CH₃ | —CH₂CH₂— | ...do... | —COCH₃ | Do. |
| 51 | —OCH₃ | —CO— | —C₄H₉ | —CH₂CH₂— | ...do... | —COCH₃ | Do. |
| 51 | —OCH₃ | —CO— | —C₄H₉ | —CH₂CH₂— | ...do... | —COCH₃ | Do. |
| 51a | —OCH₃ | —CO— | —CH₃ | —CH₂CH₂— | ...do... | —COCH₃ | Do. | of sodium acetate are added to the coupling mixture and then the black dyestuff precipitate is filtered off. Its composition corresponds to the above formula. The dyestuff is thoroughly washed first with dilute sodium carbonate solution and then with water. After drying, 8 g. of the dyestuff are brought into a form which is finely dispersable in water by milling with 8 g. of the sodium salt of a condensation product of naphthalene-2-sulfonic acid with formaldehyde and 16 g. of lignin sulfonate. Polyglycol terephthalate fibers can be dyed with this preparation from aqueous dispersion, optionally in the presence of a carrier such as sodium-o-phenyl phenolate, in navy blue shades. The dyeings have good fastness to perspiration, washing, rubbing and sublimation.

If in Example 52 the 19.7 g. of 1-amino-2,4-dinitro-6-methylbenzene are replaced by 21.3 g. of 1-amino-2,4-dinitro-6-methoxybenzene, 22.7 g. of 1-amino-2,4-dinitro-6-ethoxybenzene, 25.5 g. of 1-amino - 2,4-dinitro-6-carbethoxybenzene or 24.9 g. of 1-amino-2,4-dinitro-6-methylsulfonylbenzene and otherwise the procedure described in the example is followed, then dyestuffs are obtained which produce navy blue dyeings on polyglycol terephthalate fibers. The dyeings have similarly good properties.

EXAMPLE 53

6 g. of the dyestuff obtained according to Example 1 are dispersed in 4000 g. of water. 20 g. of sodium-o-phenyl phenolate as carrier and 20 g. of diammonium phosphate are added to this dispersion and 100 g. of polyglycol terephthalate yarn are dyed for 1½ hours at 95–98°. The dyebath is substantially exhausted. The dyeing is rinsed with water and then with dilute aqueous sodium hydroxide solution and after-treated with a dispersing agent.

In this way, a reddish navy blue dyeing is obtained which is fast to washing, light and sublimation.

If in the above example, the 100 g. of polyglycol terephthalate yarn are replaced by 100 g. of cellulose triacetate fabric, dyeing is performed under the conditions given and the dyeing is then rinsed with water, then a reddish navy blue dyeing is obtained which has very good fastness to washing, light and sublimation.

EXAMPLE 54

In a pressure dyeing apparatus, 7 g. of the dyestuff obtained according to Example 18 are finely suspended in 2000 g. of water containing 4 g. of oleyl polyglycol ether. The pH of the dyebath is adjusted to 5 to 5.5 with acetic acid.

100 g. of polyglycol terephthalate fabric are introduced at 50°, the bath is heated to 130° within 30 minutes and dyeing is performed for 50 minutes at this temperature. The dyeing is then rinsed with water, soaped and dried. Under these conditions, a greenish navy blue dyeing is obtained which is fast to washing, perspiration, light and sublimation.

The dyestuffs described in the other examples produce dyeings of equal quality by this process.

EXAMPLE 55

Polyglycol terephthalate fabric (such as "Dacron," Registered Trademark of E. I. Du Pont de Nemours, Wilmington, Del., U.S.A.) is pad dyed in a foulard at 40° with a liquor of the following composition:

60 g. of dyestuff mixture according to Example 33, finely dispersed in
7.5 g. of sodium alginate,
10.0 g. of coconut oil fatty acid-N,N-bis-(β-hydroxyethyl)-amide and
920.0 g. of water.

The fabric, squeezed out to a liquor content of about 100%, is dried at 100° and then the dyeing is fixed for 60 seconds at a temperature of 210°. The dyed goods are rinsed with water, soaped and dried. Under these conditions, a navy blue dyeing is obtained which is fast to washing, rubbing, light and sublimation.

The dyestuffs described in the other examples produce dyeings of equal quality by this process.

I claim:
1. A process for the coloring of hydrophobic organic material comprising contacting a fibrous material consisting essentially of fibers selected from the group consisting of linear high-molecular ester of aromatic polycarboxylic acid with polyfunctional alcohol, cellulose triacetate, synthetic polyamide and polyacrylonitrile, with a dispersion of a dyestuff of the formula

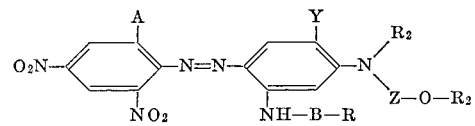

wherein

A represents hydrogen, chlorine or bromine, lower alkyl, lower alkoxy, lower carbalkoxy or lower alkylsulfonyl;
Y represents lower alkoxy;
B represents the —CO, —COO— or —SO$_2$-group;
R represents lower alkyl;
Z represents alkylene having 2 to 4 carbon atoms;
R$_1$ represents monocarbocyclic aryl-lower alkyl which may be ring-substituted by halogen, lower alkyl, or lower alkoxy; and
R$_2$ represents lower alkanoyl.

2. A process according to claim 1, wherein the hydrophobic organic fibers are the linear, high molecular weight esters of aromatic polycarboxylic acids with polyfunctional alcohols.

3. A process according to claim 1 wherein the hydrophobic organic fibers consist of cellulose triacetate.

4. Hydrophobic organic fibers dyed with a dyestuff of the formula

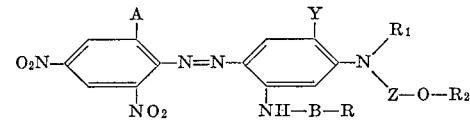

wherein

A represents hydrogen, chlorine or bromine, lower alkyl, lower alkoxy, lower carbalkoxy or lower alkylsulfonyl;
Y represents lower alkoxy;
B represents the —CO—, —COO— or —SO$_2$-group;
R represents lower alkyl;
Z represents alkylene having 2 to 4 carbon atoms;
R$_1$ represents monocarbocyclic aryl-lower alkyl which may be ring-substituted by halogen, lower alkyl, or lower alkoxy; and
R$_2$ represents lower alkanoyl.

References Cited

UNITED STATES PATENTS

| 2,030,896 | 2/1936 | Henshaw | 260—97 |
| 2,283,211 | 5/1942 | Jones et al. | 260—155 |
| 2,910,463 | 10/1959 | Urbschat et al. | 260—152 |
| 3,207,569 | 9/1965 | Thummel | 8—26 |
| 3,300,472 | 1/1967 | Kleiman et al. | 260—149 |

FOREIGN PATENTS

| 1,037,164 | 7/1966 | Great Britain. |

DONALD LEVY, Primary Examiner
BERNARD BETTIS, Assistant Examiner

U.S. Cl. X.R.
8—50, 55, 41